United States Patent
Go et al.

(10) Patent No.: US 10,745,636 B2
(45) Date of Patent: Aug. 18, 2020

(54) LAMINATE FOR REDUCING FLOW RESISTANCE AND MANUFACTURING METHOD THEREFOR

(71) Applicant: PUSAN NATIONAL UNIVERSITY INDUSTRY UNIVERSITY COOPERATION FOUNDATION OF PUSAN, Busan (KR)

(72) Inventors: Jeung Sang Go, Busan (KR); Hyun-jong Paik, Busan (KR); Kyung Chun Kim, Busan (KR); Sang Youl Yoon, Busan (KR)

(73) Assignee: PUSAN NATIONAL UNIVERSITY INDUSTRY UNIVERSITY COOPERATION, Busan (KR)

( * ) Notice: Subject to any disclaimer, the term of this patent is extended or adjusted under 35 U.S.C. 154(b) by 329 days.

(21) Appl. No.: 15/563,514

(22) PCT Filed: Apr. 5, 2016

(86) PCT No.: PCT/KR2016/003482
§ 371 (c)(1),
(2) Date: Nov. 3, 2017

(87) PCT Pub. No.: WO2016/163701
PCT Pub. Date: Oct. 13, 2016

(65) Prior Publication Data
US 2018/0346840 A1    Dec. 6, 2018

(30) Foreign Application Priority Data

Apr. 8, 2015 (KR) .................. 10-2015-0049858

(51) Int. Cl.
*B32B 3/26* (2006.01)
*B05D 5/02* (2006.01)
(Continued)

(52) U.S. Cl.
CPC .......... *C10M 111/04* (2013.01); *B05D 1/005* (2013.01); *B05D 3/0254* (2013.01); *B05D 5/02* (2013.01);
(Continued)

(58) Field of Classification Search
CPC ................ B05D 5/02; B05D 5/08; B32B 3/26
See application file for complete search history.

(56) References Cited

U.S. PATENT DOCUMENTS

| | | | |
|---|---|---|---|
| 2002/0112630 A1* | 8/2002 | Verschueren | B41C 1/1008 101/450.1 |
| 2007/0042693 A1* | 2/2007 | Saikin | B24B 37/205 451/527 |
| 2009/0263586 A1 | 10/2009 | Goedicke et al. | |

FOREIGN PATENT DOCUMENTS

| | | |
|---|---|---|
| JP | 07-017476 A | 1/1995 |
| JP | 2004-238746 | 8/2004 |

(Continued)

OTHER PUBLICATIONS

International Search Report issued in PCT Application No. PCT/KR2016/003482, dated Jul. 19, 2016.
(Continued)

*Primary Examiner* — Robert A Vetere
(74) *Attorney, Agent, or Firm* — Norton Rose Fulbright US LLP

(57) ABSTRACT

There is provided a flow-resistance reducing laminate comprising: a substrate; and a flow-resistance reducing layer formed on the substrate, wherein the flow-resistance reducing layer has a surface portion facing a liquid, wherein a flow interface is formed between the liquid and the laminate upon relative movement between the liquid and the laminate, wherein the flow-resistance reducing layer is configured such that an air layer defines the flow interface.

10 Claims, 5 Drawing Sheets

(51) Int. Cl.
*B05D 5/08* (2006.01)
*C10M 111/04* (2006.01)
*B32B 5/18* (2006.01)
*F15D 1/00* (2006.01)
*B05D 1/00* (2006.01)
*B05D 3/02* (2006.01)
*C10M 101/00* (2006.01)
*C10M 107/24* (2006.01)
C10N 50/08 (2006.01)
C10N 50/00 (2006.01)

(52) U.S. Cl.
CPC ............... *B05D 5/08* (2013.01); *B32B 3/26* (2013.01); *B32B 5/18* (2013.01); *C10M 101/00* (2013.01); *C10M 107/24* (2013.01); *F15D 1/00* (2013.01); *C10M 2203/003* (2013.01); *C10M 2209/043* (2013.01); *C10N 2050/08* (2013.01); *C10N 2050/12* (2020.05)

(56) References Cited

FOREIGN PATENT DOCUMENTS

| | | |
|---|---|---|
| JP | 2006-187931 | 7/2006 |
| KR | 2010-0561801 | 3/2006 |
| KR | 2010-0076439 | 7/2010 |
| KR | 2014-0139275 | 12/2014 |

OTHER PUBLICATIONS

Office Action issued in Korean Patent Application No. KR 10-2015-0049858, dated Jan. 5, 2017.

* cited by examiner

[FIG. 1]
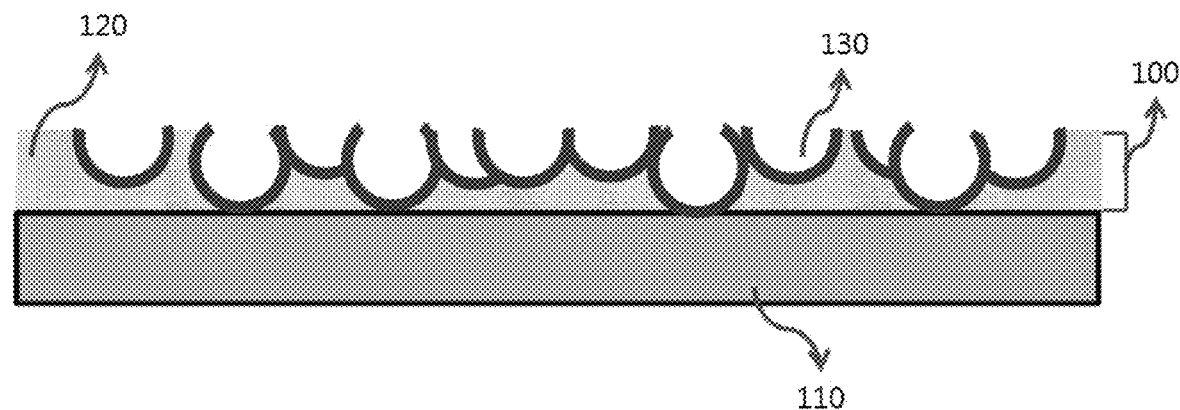
[FIG. 2]
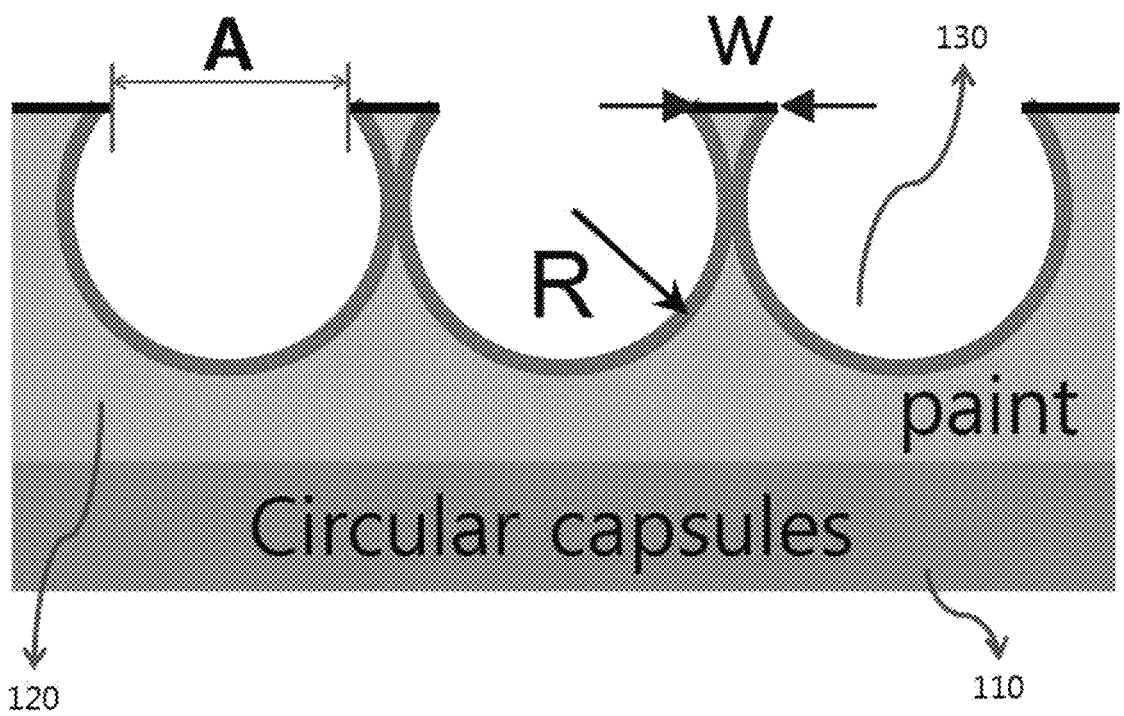

[FIG. 3]
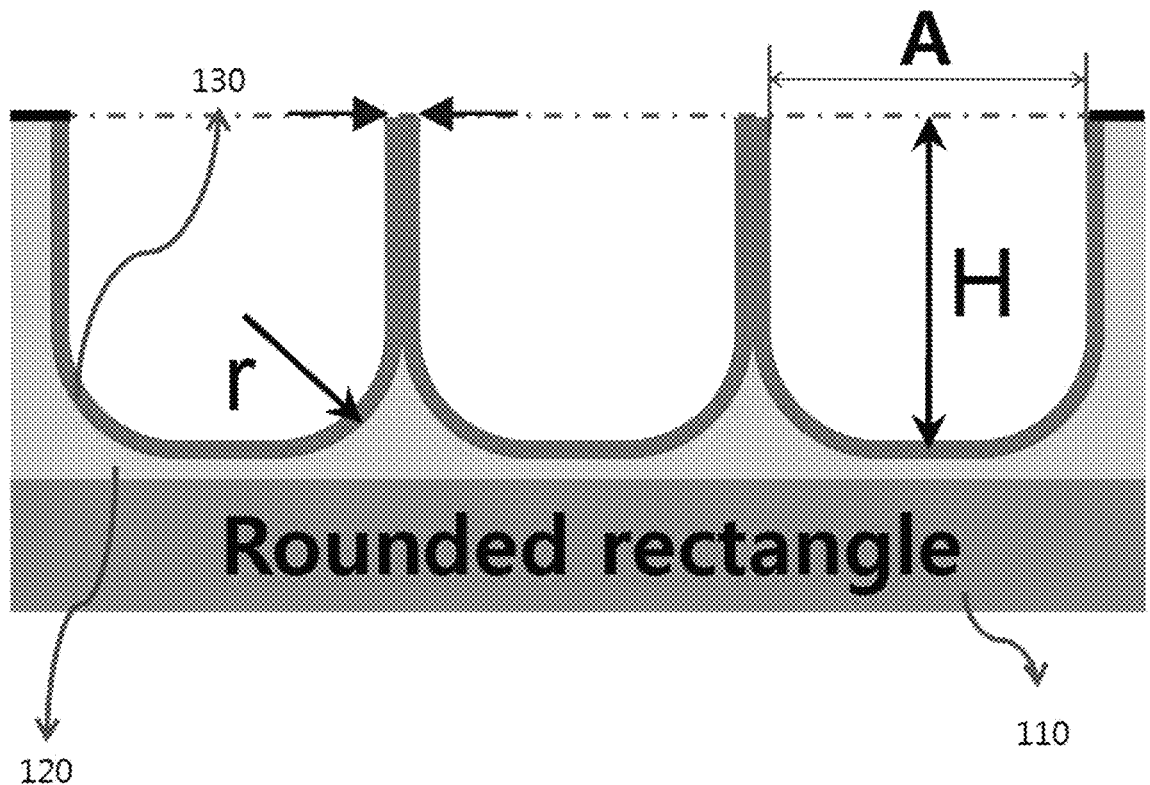
[FIG. 4]
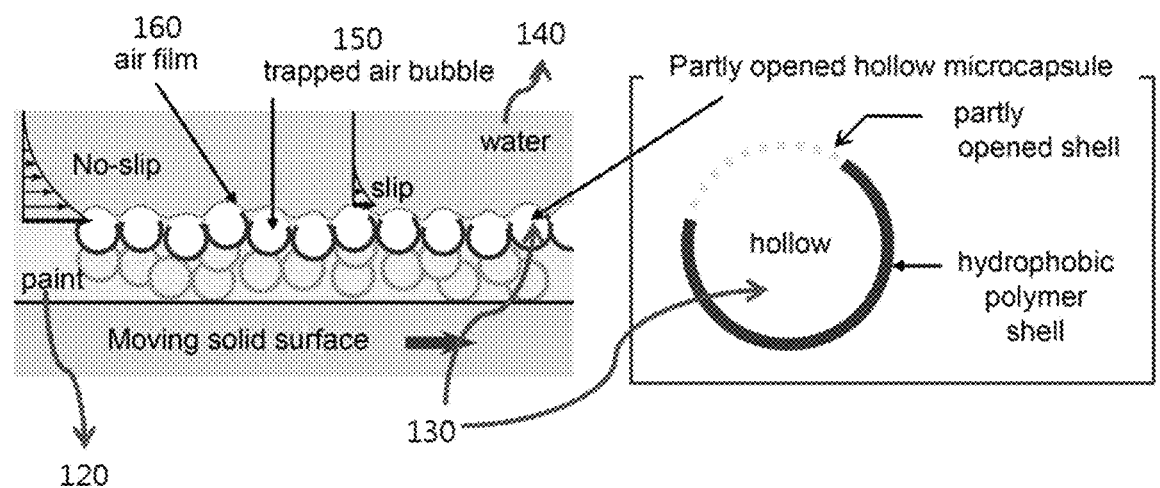

[FIG. 5]
(a) Mixing of microcapsules with paint
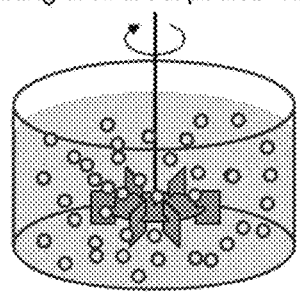
(b) Surface coating and heating
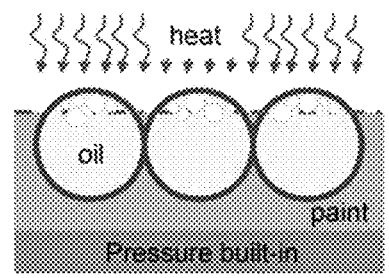
(c) Deformation
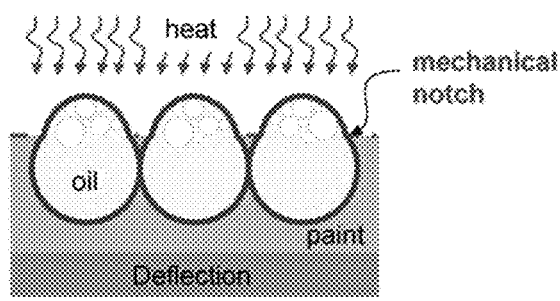
(d) Rupture
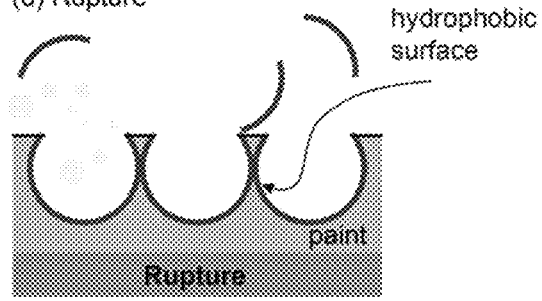

[FIG. 6]
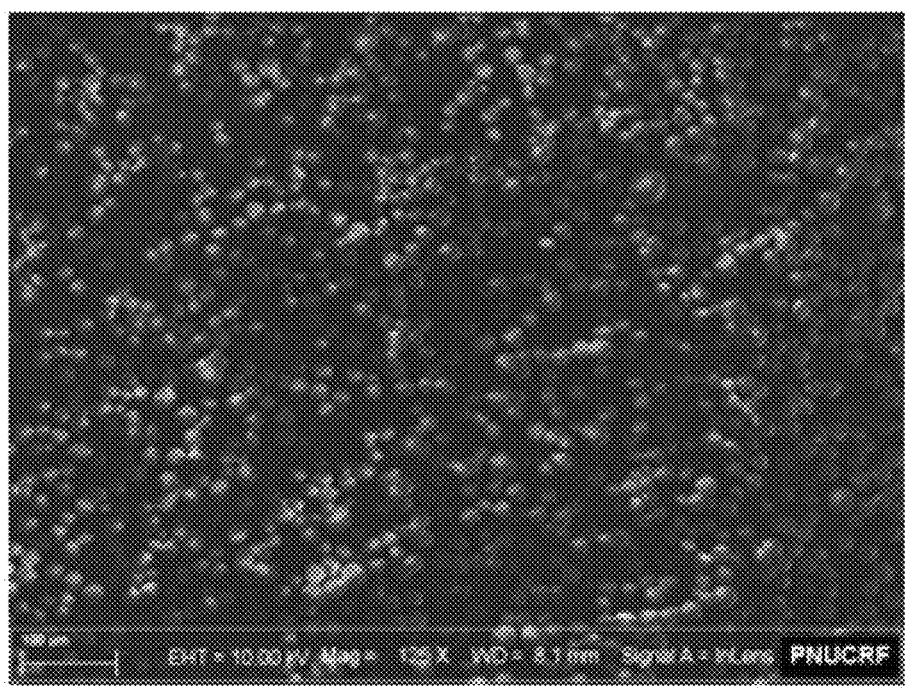

[FIG. 7]
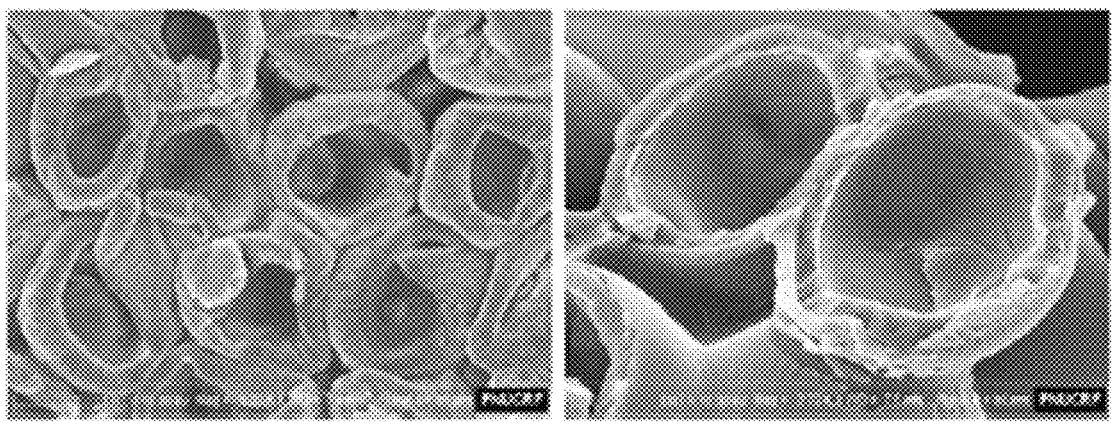

LAMINATE FOR REDUCING FLOW RESISTANCE AND MANUFACTURING METHOD THEREFOR

This application is a national phase under 35 U.S.C. § 371 of International Application No. PCT/KR2016/003482, filed Apr. 5, 2016, which claims the benefit of priority to Korean Patent Application Serial No. KR 10-2015-0049858, filed Apr. 8, 2015. The entire contents of each of the above-referenced applications are incorporated into the present application by reference.

BACKGROUND

Field of the Present Disclosure

The present invention relates to a surface structure of an object for reducing the flow resistance generated between a fluid and an object during movement of the fluid or moving the object, and a method of manufacturing such a structure.

Discussion of Related Art

The resistance due to flow includes the frictional resistance due to the friction generated by the surface state of the object and the shape resistance due to the pressure distribution caused by the shape of the object, and such a flow resistance is a natural phenomenon inevitably generated.

Marine, offshore plants, petroleum pipelines and submarines are consuming enormous amounts of fuel to overcome this flow resistance, and, thus, the need to reduce this flow resistance is fully appreciated.

For logistics transporters, they consume about 200 trillion won of fuel per year. In particular, the flow resistance corresponds to 80% or more of the energy consumption at a low speed, and corresponds to 50% or more of the energy consumption at a high speed. When reducing the friction resistance by only 10%, our world may save up to 16 trillion won of fuel consumption per year. This may provide a solution to reduce global warming and environmental pollution.

In order to reduce the frictional resistance, studies have been actively carried out to apply a technique that imitates a living animal. In particular, research has been carried out to replicate surface properties and structures of swimming animals swimming in the sea, thereby reducing friction resistance. For example, it has been reported that by replicating flexible dolphin skin, it is possible to reduce friction resistance by up to 5%. A reduction in frictional resistance of up to 8% was reported by applying a riblet structure replicating the skin of a shark consisting of protrusions with specific widths and depths in the flow direction. However, since it requires precise processing of less than 200 microns, it is difficult to apply the same to a large area, and there is a problem of including microbial adhesion.

As another representative biomimetic technique, it has been shown that the friction resistance can be reduced up to 80% based on the amount of polymer sprayed onto the surface, such as the mucus secretion of fish. However, since the polymer must be continuously sprayed on the surface, there is a problem of environmental pollution.

Air Injection technology has been introduced that injects air bubbles onto the surface and reduces friction resistance by up to 80% according to the injection amount. However, in the case of ships, there are problems such as loss of buoyancy and propulsion, generation of cavities due to bubbles, mounting of actuators for compressed air injection, and so on. Thus, these techniques have not been commercialized to date.

SUMMARY

The present inventors have fully recognized the above-described problems of the prior art, and have come up with a new type of fluid resistance reduction technique which overcomes these problems completely.

The present inventors have developed the present invention based on the fact that before the penguins enter the water, they sufficiently fill the air between feathers on the land. The effect of the penguin's air layer on frictional resistance reduction may be confirmed by comparing the flow velocity distribution and shear force based on the presence or absence of an air layer in the object surface portion. In the absence of an air layer in the surface portion, the velocity gradient is large and, thus, a large shear force is generated, while, when there is an air layer in the surface portion, a strong slip occurs on the surface of the air layer, so that the velocity gradient is small and, thus, a small shear force is obtained. As a result, the air layer plays a role in greatly reducing the flow friction resistance.

The present invention aims at providing a reduction in the flow friction resistance due to such an air layer. In order to achieve this object, the present invention has been made as follows.

In one aspect, there is provided a flow-resistance reducing laminate comprising: a substrate; and a flow-resistance reducing layer formed on the substrate, wherein the flow-resistance reducing layer has a surface portion facing a liquid, wherein a flow interface is formed between the liquid and the laminate upon relative movement between the liquid and the laminate, wherein the flow-resistance reducing layer is configured such that an air layer defines the flow interface.

The substrate is related to object having a substrate having a surface that requires a reduction in the flow friction resistance. For example, the substrate may refer to the substrate of the object having the substrate in contact with water, such as a vessel, an offshore plant, a petroleum pipeline, and a submarine.

Flow resistance refers to the resistance generated at the interface between an object and a fluid, which is caused by movement of a fluid or movement of an object. There may be a frictional resistance caused by the surface state of the object and a shape resistance due to a pressure difference caused by the shape of the object. The flow-resistance reducing laminate according to the present invention can reduce this frictional resistance to nearly zero, thereby reducing energy loss.

The flow-resistance reducing layer refers to a layer that is deposited or formed on a surface of a substrate of the above-described object, which is required to reduce the flow friction resistance, thereby reducing the flow resistance of the object. The flow-resistance reducing layer according to the present invention is configured to confine air therein to form an air layer as a flow interface between the fluid and the layer when flow resistance occurs due to the fluid flow on the surface of the layer.

In one embodiment of the flow-resistance reducing laminate, the surface portion of the flow-resistance reducing layer has a plurality of cavities defined therein, wherein when the surface portion faces the liquid, the air is filled in the cavities, wherein the shape of each of the cavities is configured such that when the flow interface is formed, the air filled in each cavity is kept trapped therein.

In one embodiment of the flow-resistance reducing laminate, each cavity has a spherical shape having an open portion defined therein toward the liquid, wherein a length of the open portion of the cavity toward the liquid is smaller than a radius of the spherical cavity so that the air filled in the cavity is kept trapped therein. In one embodiment of the flow-resistance reducing laminate, each cavity has a cylindrical shape having a rounded edge and having a first depth and having an opened portion; or each cavity has a rectangular cross-section shape having rounded corners and edges and having the first depth and an opened portion, wherein a relationship between a length of the open portion of the cavity toward the liquid and the first depth is defined so that the air filled in the cavity is kept trapped therein.

In one embodiment of the flow-resistance reducing laminate, the flow-resistance reducing layer includes a support layer in contact with the substrate, wherein a plurality of hollow micro-capsules is dispersed in the support layer or in a surface portion of the support layer, wherein each hollow micro-capsule is partially open to define a corresponding cavity.

In one embodiment of the flow-resistance reducing laminate, wherein an inner face of each cavity surface is water repellent to form the air layer.

In another aspect, there is provided a method of manufacturing a sheet having a plurality of cavities defined in a surface portion thereof, the method comprising: providing a plurality of micro-capsules carrying a thermally expandable material therein, wherein each capsule has a shell surrounding the thermally expandable material; dispersing the plurality of micro-capsules in a support layer; floating at least some of the hollow micro-capsules upwardly into a surface portion of the support layer such that said at least some of the micro-capsules are exposed upwardly; expanding the thermally expandable material contained in the shells by heating the exposed micro-capsules; and rupturing an exposed portion of the shell of each micro-capsule by the expansion to hollow each capsule to form a corresponding cavity.

As used herein, the support layer may refer to a layer that binds the micro-capsule and fixes the micro-capsule to form the cavity in the surface portion. In order to realize the role of the supporting of such a micro-capsule, the support layer is merely referred to as a support layer, and the range according to the present invention should not be reduced by this naming. The support layer according to the present invention will be understood to mean a layer having a flow-resistance reducing surface formed on the substrate. This support layer may be mad of, for example, a polymer material. The support layer may be obtained by dispersing micro-capsules in a polymer dissolved in an organic solvent, applying the dispersion on the substrate by a method such as spin coating, spraying, or die coating, and curing the dispersion.

In one embodiment of the method of manufacturing a sheet having a plurality of cavities defined in a surface portion thereof, when the micro-capsules are dispersed in the support layer, the micro-capsules are in close contact with each other, such that each of the capsule has a cylindrical shape having a rounded edge or a rectangular cross-section shape having rounded corners and edges. When the cavity is formed by rupture of the hollow micro-capsule, the air layer with high density may be formed in the support layer, thereby maximizing the flow-resistance reducing performance.

In one embodiment of the method of manufacturing a sheet having a plurality of cavities defined in a surface portion thereof, the support layer includes a liquid-phase or gel-phase support layer precursor, wherein dispersing the plurality of micro-capsules in the support layer includes dispersing the plurality of micro-capsules in the liquid-phase or gel-phase support layer precursor, wherein heating the exposed micro-capsules includes curing the liquid-phase or gel-phase support layer precursor.

The precursor has a liquid or gel-like state, and the micro-capsule can flow in the precursor. The precursor refers to a material that is cured to change its state to support the micro-capsule.

In one embodiment of the method of manufacturing a sheet having a plurality of cavities defined in a surface portion thereof, the support layer includes a liquid-phase or gel-phase support layer precursor, wherein dispersing the plurality of micro-capsules in the support layer includes dispersing the plurality of micro-capsules in the liquid-phase or gel-phase support layer precursor, wherein heating the exposed micro-capsules includes curing the liquid-phase or gel-phase support layer precursor, wherein the method further comprises applying the liquid-phase or gel-phase support layer precursor having the plurality of micro-capsules dispersed therein onto a surface of a substrate.

In one embodiment of the method of manufacturing a sheet having a plurality of cavities defined in a surface portion thereof, the thermally expandable material surrounded by the shell has a lower specific gravity than a material of the support layer. In addition, the thickness of the precursor when applied may be smaller than the height of the micro-capsule such that the capsule may be exposed from the precursor surface portion.

In one embodiment of the method of manufacturing a sheet having a plurality of cavities defined in a surface portion thereof, the shell of the micro-capsule is water-repellant.

In one embodiment of the method of manufacturing a sheet having a plurality of cavities defined in a surface portion thereof, the thermally expandable material is un-permeable through the shell of the micro-capsule such that the shell is ruptured by the thermal expansion of the thermally expandable material.

In one embodiment of the method of manufacturing a sheet having a plurality of cavities defined in a surface portion thereof, the shell of the micro-capsule is brittle such that the shell is ruptured by the thermal expansion of the thermally expandable material.

In one embodiment of the method, the shell of the micro-capsule is non-dissolved into the support layer or the support layer precursor.

In one embodiment of the method, the thermally expandable material surrounded by the shell includes a thermally expandable gas, oil and/or liquid.

In another aspect, the present invention provides a self-cleaning sheet comprising the special surface structure of the laminate for flow-resistance reduction as described above. The special surface structure according to the present invention reduces the flow resistance to near zero and thus can provide a superior cleaning effect.

In still another aspect, there is provided a soundproof sheet comprising the special surface structure of the laminate for flow-resistance reduction according to the present invention. Likewise, the special surface structure according to the present invention can provide an excellent effect as a soundproof sheet.

According to the present invention, when an object contacts a fluid, an air layer is formed on the surface portion of the object, and this air layer generates a strong slip, whereby the velocity gradient is small and a small shear force is realized. In this way, a near-zero flow friction resistance can be provided.

BRIEF DESCRIPTION OF THE DRAWINGS

FIG. 1 is a schematic view showing a cross-section of a laminate for flow-resistance reduction according to the present invention.

FIG. 2 is a schematic diagram illustrating that the cavity inner surface is spherical.

FIG. 3 is a schematic diagram illustrating that the cavity inner surface has a square shape with rounded corners or rounded cylindrical shape;

FIG. 4 illustrates an example in which a laminate for flow-resistance reduction according to the present invention contacts a liquid, for example, when the laminate moves relative to the liquid, air filled in the cavity forms the air layer.

FIG. 5 is a schematic view showing a method of manufacturing a laminate for flow-resistance reducing according to the present invention.

FIG. 6 is an enlarged view of a micro-capsule dispersed support layer prepared according to an embodiment of the present invention.

FIG. 7 is an enlarged view of a hollow micro-capsule prepared according to an embodiment of the present invention in which a surface exposed shell thereof is ruptured and a cavity is defined on the surface.

DETAILED DESCRIPTIONS

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims. The same reference numbers in different figures denote the same or similar elements, and as such perform similar functionality.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic view showing a cross-section of a laminate for flow-resistance reduction according to the present invention. A laminate for flow-resistance reduction according to the present invention comprises a substrate 110; and a flow-resistance reducing layer 100 formed on the substrate 110, wherein the flow-resistance reducing layer 100 includes a support layer 120 in contact with the substrate, and the support layer 120 has a cavity 130 defined in a surface portion thereof.

The cavity 130 in accordance with the present invention may be configured to define the recessed space having a circular shape (see FIG. 2) or a rectangular surface (see FIG. 3) having a rounded corner in the surface portion of the support layer. The recessed space contains air therein; when the flow-resistance reducing laminate according to the present invention is in contact with the liquid, air is retained in the cavity, and the air layer is formed by fluid movement or laminate movement. Thus, the length of the open portion of the cavity is defined such that the air layer remains within the cavity as the fluid moves or the laminate moves.

As seen from FIG. 2, the inner surface of the cavity may be spherical or cylindrical with the rounded corners; in this case, the length of the open portion of the cavity (designated by reference A in FIG. 2) may be less than the radius of the spherical cavity (R in FIG. 2) so that the air filled in the cavity is trapped therein. In this connection, limiting the length A to a specific numerical value limits the scope of the invention too much. Accordingly, those skilled in the art will be able to set the length A so that the air in the cavity can be trapped therein at various flow interfaces that are generated, in accordance with the application of the present invention.

Further, as illustrated in FIG. 3, the cavity inner surface may be a rounded rectangle having the rounded corners. The depth of the cavity (H in FIG. 3) and the length of the open portion of the cavity (A in FIG. 3) may be defined so that the air filled in the cavity is trapped therein. It will be appreciated that the limitation of the length A to a specific value overrides the scope of the present invention. Accordingly, those skilled in the art will be able to set the length A so that the air in the cavity can be trapped therein at various flow interfaces that are generated, in accordance with the application of the present invention.

In particular, it is desirable that the surface forming this cavity may be water repellent so that the cavity maintains air therein and the air layer forms well as the fluid moves.

FIG. 4 is a cross-sectional view of a laminate for flow-resistance reduction according to the present invention in which, when, the air in the cavity is in contact with a liquid, in particular, when the laminate moves relative to the liquid, the air filled in in the cavity (shown as hollow in FIG. 4) forms the air layer thereon.

The flow-resistance reducing layer, having a support layer 120 designated as "paint" in FIG. 4 and a cavity 130 defined in the surface portion of the support layer 120, faces the liquid 140. Air is trapped in the cavity (as shown in 150. When the flow-resistance reducing layer moves to the right in the drawing, an air film 160 is formed. That is, the air film 160, which is a flow interface, is defined between the air layer and the liquid 140, thereby rapidly reducing the flow resistance.

FIG. 5 is a schematic view showing a method of manufacturing a laminate for flow-resistance reducing according to the present invention.

FIG. 5A shows preparing for a hollow micro-capsule in which a thermally expandable material (e.g., oil) is contained therein; further, FIG. 5A illustrates the step of dispersing the hollow micro-capsules in a liquid support layer precursor (e.g., a coatable liquid paint). FIG. 5D shows the hollow oil-carrying micro-capsule floated toward the paint surface portion, wherein the support layer precursor (e.g., paint) is cured and heat is applied to the surface portion thereof. FIG. 5c illustrates the expansion of the oil carried in the micro-capsule by heat; FIG. 5D illustrates a step in which a rupture occurs in a notch at which the shell of the micro-capsule starts to be exposed from the support layer, thereby starting the hollow process in the support layer surface portion.

Example 1

The oil-contained micro-capsule and PVA (polyvinyl alcohol) were dispersed at a ratio of 1:1. The micro-capsules were well dispersed in the PVA. This capsule-dispersed PVA was spin-coated onto the silicon surface. The specific gravity of the oil was smaller than the specific gravity of the PVA, so that the micro-capsule floated toward the PVA surface, and the PVA was cured after a certain time. See the SEM picture of FIG. 6. As shown in the SEM photograph of FIG. 7, the shell of the micro-capsule was ruptured and a surface portion of the PVA having the partially opened micro-cavities was formed.

While the present invention has been particularly shown and described with reference to exemplary embodiments thereof, it will be understood by those skilled in the art that various changes in form and details may be made therein without departing from the spirit and scope of the invention as defined by the following claims.

What is claimed is:

1. A method of manufacturing a flow-resistance-reducing sheet having a plurality of cavities defined in a surface portion thereof, the method comprising:
   providing a plurality of micro-capsules carrying a thermally expandable material therein, wherein each capsule has a shell surrounding the thermally expandable material;
   dispersing the plurality of micro-capsules in a support layer;
   floating at least some of the micro-capsules upwardly into a surface portion of the support layer such that at least some of the micro-capsules are exposed upwardly, wherein the at least some micro-capsules exposed upwardly are in contact with each other;
   expanding the thermally expandable material contained in the shells by heating the exposed micro-capsules; and
   rupturing an exposed portion of the shell of each micro-capsule by the expansion to hollow each capsule to form a corresponding cavity.

2. The method of claim 1, wherein when the micro-capsules are dispersed in the surface portion of the support layer, the micro-capsules have a cylindrical shape having a rounded edge or a rectangular cross-section shape having rounded corners and edges.

3. The method of claim 1, wherein the support layer includes a liquid-phase or gel-phase support layer precursor, wherein dispersing the plurality of micro-capsules in the support layer includes dispersing the plurality of micro-capsules in the liquid-phase or gel-phase support layer precursor, wherein heating the exposed micro-capsules includes curing the liquid-phase or gel-phase support layer precursor.

4. The method of claim 1, wherein the support layer includes a liquid-phase or gel-phase support layer precursor, wherein dispersing the plurality of micro-capsules in the support layer includes dispersing the plurality of micro-capsules in the liquid-phase or gel-phase support layer precursor, wherein heating the exposed micro-capsules includes curing the liquid-phase or gel-phase support layer precursor, wherein the method further comprises applying the liquid-phase or gel-phase support layer precursor having the plurality of micro-capsules dispersed therein onto a surface of a substrate.

5. The method of claim 1, wherein the shell of each micro-capsule is water-repellent.

6. The method of claim 1, wherein the thermally expandable material is un-permeable through the shell of the micro-capsule such that the shell is ruptured by the thermal expansion of the thermally expandable material.

7. The method of claim 1, wherein the shell of the micro-capsule is brittle such that the shell is ruptured by the thermal expansion of the thermally expandable material.

8. The method of claim 1, wherein the shell of the micro-capsule is non-dissolved into the support layer or the support layer precursor.

9. The method of claim 1, wherein the thermally expandable material surrounded by the shell includes a thermally expandable gas, oil and/or liquid.

10. The method of claim 1, wherein the thermally expandable material surrounded by the shell has a lower specific gravity than a material of the support layer.

* * * * *